United States Patent Office 3,174,925
Patented Mar. 23, 1965

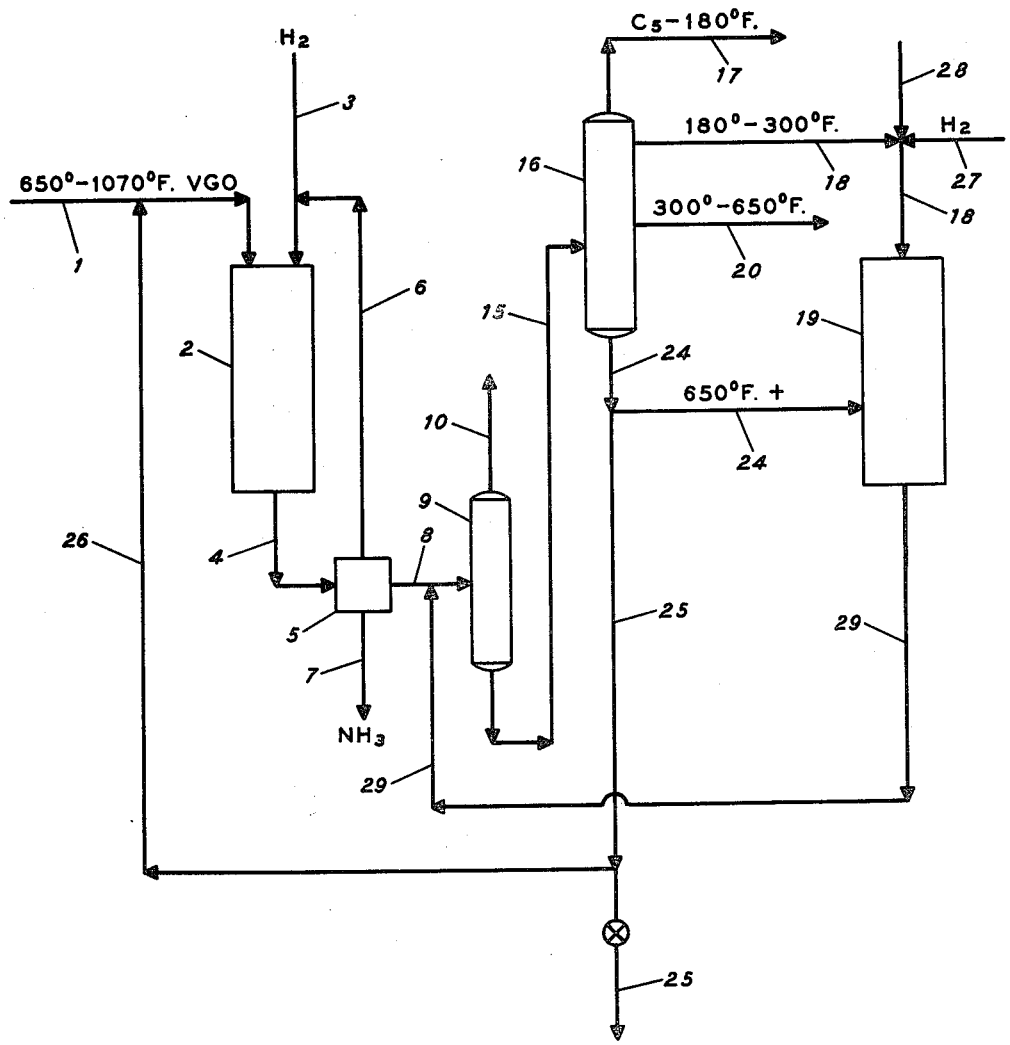

3,174,925
HYDROCARBON CONVERSION PROCESS UTILIZING TWO HYDROCRACKING REACTORS
William H. Claussen, Contra Costa County, and George D. Gould, Orinda, Calif., assignors to California Research Corporation, San Francisco, Calif., a corporation of Delaware
Filed Dec. 26, 1962, Ser. No. 247,035
6 Claims. (Cl. 208—59)

This invention relates to a hydrocarbon conversion process, more particularly to a hydrocarbon conversion process for converting petroleum distillates and residua into various valuable products, and still more particularly to a catalytic conversion process capable of producing middle distillates, light gasoline and valuable gaseous products including isobutane.

PRIOR ART HYDROCRACKING OF HYDROCARBON FEEDS TO PRODUCE MIDDLE DISTILLATES AND GASOLINE, AND PROBLEMS INVOLVED

A. *Nitrogen content of feed.*—It is well known that nitrogen in a hydrocarbon feed is deleterious to certain hydrocracking catalysts, particularly highly acidic hydrocracking catalysts, and that, in order to provide a practical process for producing gasoline from a feed containing substantial amounts of nitrogen, a first stage catalyst relatively insensitive to nitrogen poisoning and having no more than weak acidity has been necessary. However, such catalysts having no more than weak acidity frequently result in the production of substantial quantities of middle distillates, heavy gasoline and even heavier materials, although they do produce some light gasoline.

B. *Ratio of iso-$C_4$ to normal-$C_4$ product.*—It is well known that a high iso-$C_4$ to normal-$C_4$ product from a hydrocracking zone is highly desirable. Isobutane, for example, is useful as an alkylation plant feed. Isobutane also is a valuable product for use in motor gasoline blending, whereas normal butane is less valuable. A low iso-$C_4$ to normal-$C_4$ product ratio has been a disadvantage of many prior art processes.

C. *Paraffinicity of unconverted bottoms fraction recycled to reactor.*—It is well known that various prior art catalysts, particularly catalysts of extremely low activity which are useful in the production of middle distillates and catalysts of extremely high activity which are useful in the production of gasoline, produce an unconverted bottoms fraction having a high content of normal paraffins. It is known that these normal paraffins are deleterious to the hydrocracking operation because they are extremely refractory to further hydrocracking and therefore, particularly where high middle distillate production is desired, as a practical matter, cannot be recycled. It would be desirable if a two-stage process were available for producing middle distillates, light gasoline and isobutane in both stages without producing a first stage bottoms product having a normal paraffin content too high to permit a practical recycle thereof to the first stage.

D. *Regeneration.*—It is known that many prior art hydrocracking catalysts lose a great deal of their fresh catalyst activity upon regeneration, and it would be very desirable if the catalysts used in processes for meeting the foregoing prior art problems were regenerable.

E. *Hydrocracking of naphthas to gaseous products and hydrocracking of heavier stocks to liquid products.*—Heretofore it has been known to hydrocrack naphtha fractions to valuable gaseous products including isobutane. It has also been known to hydrocrack heavier stocks, for example vacuum gas oils, to valuable liquid products, for example low pour point diesel gas oils. However, the aforesaid conversions generally have required separate hydrocracking reactors where it has been desired to accomplish them in the presence of an acidic hydrocracking catalyst, for example nickel sulfide on silica-alumina. It would be desirable if a process were available for producing gasoline, middle distillates and isobutane from a petroleum distillate or petroleum residua boiling above about 650° F. in a first hydrocracking stage employing a weakly acidic catalyst to maximize middle distillate production, and for hydrocracking both the light gasoline material and the 650° F.+material produced in this first stage in a single additional stage employing an acidic hydrocracking catalyst, rather than separately processing these materials in two different reactors, each containing an acidic hydrocracking catalyst.

OBJECTS

In view of the foregoing, it is an object of the invention to provide a two-stage process using selected catalysts, capable of converting hydrocarbon feed stocks that have a high nitrogen content as well as those that have been denitrified, to produce middle distillates, light gasoline and isobutane in large quantities, at reasonable starting and operating temperatures.

It is a further object of the present invention to provide such a process and catalysts wherein the unconverted bottoms fraction from the first stage has a sufficiently low content of normal paraffins to permit recycling a selected portion of this fraction to the first stage reactor in sustained recycle operation, to increase the overall yield of gasoline.

It is a further object of the present invention to provide such a process wherein the catalysts in each stage may be regenerated to reimpart to them a substantial portion of their original fresh activity.

It is a further object of the present invention to provide a two-stage process wherein gasoline, middle distillates and isobutane may be produced from petroleum distillates and petroleum residua boiling above about 650° F. in a first hydrocracking stage employing a weakly acidic hydrocracking catalyst, and wherein both the heavy gasoline portion and the 650° F. portion of the effluent from said first stage are further converted in a second hydrocracking stage employing an acidic hydrocracking catalyst.

DRAWING

The invention will best be understood, and further objects and advantages thereof will be apparent, from the following description when read in conjunction with the accompanying drawing which is a diagrammatic illustration of process units and flow paths suitable for carrying out the process of the invention.

STATEMENT OF INVENTION

In accordance with the present invention there is provided a process for producing gasoline, middle distillates and isobutane from a hydrocarbon feed selected from the group consisting of petroleum distillates boiling from about 650° to 1100° F. and petroleum risidua boiling above 650° F., which comprises contacting said feed and from 100 to 10,000 s.c.f. of hydrogen per barrel of said feed in a first conversion zone at a temperature from 500° F. to 950° F., a pressure above 500 p.s.i.g. and an LHSV of 0.1 to 4.0 with a weakly acidic hydrocracking catalyst, recovering from the effluent from said first conversion zone a gaseous stream comprising isobutane, a middle distillate product, a light gasoline product, a heavy gasoline fraction and a fraction boiling above about 650° F., hydrocracking at least a substantial portion of said heavy gasoline fraction by passage thereof through a body of active acidic hydrocracking catalyst in a second conversion zone under hydrocracking conditions, hydrocracking at least a substantial portion of said fraction boiling above about 650° F. by passage thereof through only a portion of said body of active acidic hydrocracking catalyst in said second conversion zone under said hydrocracking conditions, and recovering from the effluent from said second conversion zone a gaseous stream comprising isobutane, a middle distillate product, a light gasoline product and a heavy gasoline fraction.

Said weakly acidic hydrocracking catalyst may comprise at least one hydrogenating component selected from the Group VI metals and compounds of Group VI metals and at least one hydrogenating component selected from the Group VIII metals and compounds of Group VIII metals on a catalyst support comprising silica-magnesia, the most desirable support. Said weakly acidic catalyst also may comprise nickel and molybdenum on an alumina support.

HYDROCARBON FEEDS SUITABLE FOR USE IN THE PROCESS OF THE PRESENT INVENTION

Suitable feeds for use in the process of the present invention are petroleum distillates boiling from 650° to 1100° F., and petroleum residua boiling above 650° F., and mixtures of the foregoing. Heavy gas oils and catalytic cycle oils are excellent feeds to the process as well as conventional FCC feeds and portions thereof. Residual feeds may include Minas and other paraffinic-type residua.

The present process is particularly capable of producing middle distillates, including jet fuels, which are exceptionally high in naphthene content and low in aromatic content (therefore having high smoke points) and low in normal paraffin content (therefore having low freeze points). The feed to the present process, with an initial boiling point above 650° F., is converted directly to a synthetic material, i.e., one boiling below the initial boiling point of the feed, which is a preferred jet fuel or middle distillate having high naphthene content, low normal paraffin content and therefore low freeze point, and low aromatic content and therefore exceptionally high smoke point. It has been found that feeds having lower initial boiling points, for example around 300° to 400° F., tend to produce excessive quantities of nonsynthetic products having high aromatics content and therefore low smoke points.

The present process also is particularly capable of producing valuable light gases, including isobutane, together with an excellent light gasoline product.

FIRST CONVERSION ZONE IN PROCESS OF PRESENT INVENTION, AND NITROGEN CONTENT OF FEED THERETO

It has been found that the weakly acidic hydrocracking catalyst, and particularly nickel and molybdenum or tungsten on silica-magnesia, or nickel-moylbdenum on alumina, in the first conversion zone of the process of the present invention is relatively nitrogen insensitive, compared with conventional acidic hydrocracking catalysts such as nickel sulfide on silica-alumina. Accordingly, the nitrogen content of the feed used in the process of the present invention may be relatively high, and excellent hydrocracking results still may be obtained in said conversion zone at reasonable temperatures, without the necessity for rapidly raising the temperature to maintain conversion as is necessary when hydrocracking a high nitrogen content feed over a conventional acidic hydrocracking catalyst such as nickel sulfide on silica-alumina. Although high nitrogen content feeds can be tolerated by said first conversion zone hydrocracking catalyst, it will be noted that said catalyst also is an excellent hydro-denitrification catalyst, and is efficient in concurrently hydrofining as well as in hydrocracking the feed.

Generally speaking, it is possible to operate the first conversion zone in the process of the present invention at slightly lower temperatures when the feed has a low nitrogen content, for example from 0 to 10 p.p.m. total nitrogen, than temperatures that are necessary for the same conversion when the feed has a high nitrogen content, for example from 10 to 1000 p.p.m. total nitrogen. However, even feeds containing considerably higher levels of nitrogen than 1000 p.p.m. total nitrogen may be satisfactorily converted in the process of the present invention to valuable products, contrary to conventional prior art processes wherein acidic hydrocracking catalysts, such as nickel sulfide on silica-alumina, are used. In such conventional processes, it is impossible as a practical matter to use feeds with such high nitrogen contents.

The catalyst in the first conversion zone in the process of the present invention is capable of concurrently accomplishing both denitrification and hydrocracking. The hydrocracking facilitates the concurrent denitrification because, upon the breaking of carbon-to-carbon bonds, nitrogen is more easily removed. At higher levels of cracking conversion, somewhat higher pressures may be desired to counteract catalyst fouling and deactivation.

The nitrogen compounds tend to concentrate in the heavier portions of the feed; accordingly, such heavier portions are more difficult to denitrify. However, it will be noted from the foregoing that such heavier portions also are easier to crack.

OPERATING CONDITIONS IN FIRST CONVERSION ZONE

The first conversion zone of the process of the present invention is operated at combinations of conditions selected from within the varying ranges that will produce the desired degree of hydrocracking: a temperature of about 500° to 950° F., preferably 650° to 850° F.; a hydrogen partial pressure of 500 to 3500 p.s.i.g., preferably 1000 to 2500 p.s.i.g.; and an LHSV of from about 0.1 to 4.0, preferably 0.4 to 2.0. The hydrogen flow to said conversion zone is from 1000 to 10,000 s.c.f. per barrel of feed, and preferably 2500 to 8000 s.c.f. per barrel of feed. The higher hydrogen partial pressures, particularly with unrefined feeds, give lower catalyst fouling rates and therefore for longer catalyst lives it is preferable to operate above 2000 p.s.i.g. In general, the hydrogen partial pressure will depend upon a number of factors, including type of feed stock and nitrogen content thereof, degree of denitrification required, etc.; however, in general, a hydrogen partial pressure of 1000 to 2000 p.s.i.g. is highly desirable if practicable in any given instance.

CATALYST IN FIRST CONVERSION ZONE

A. *Composition of catalyst, general.*—It is essential for the catalyst in the first conversion zone in the process of the present invention to comprise nickel-molybdenum on an alumina support, or for it to have (*a*) a silica-magnesia support, and (*b*) at least two hydrogenating components, at least one of which must be a Group VI metal or compound thereof and at least one of which must be a Group VIII metal or compound thereof.

B. *Catalyst with silica-magnesia support.*—It has been found that, where the catalyst comprises a Group VI metal or compound thereof alone, without a Group VIII metal or compound thereof, the catalyst has an unacceptably low activity. It has been found that, where the catalyst comprises a Group VIII metal or compound thereof alone, without a Group VI metal or compound thereof, the catalyst has an exceptionally high fouling rate. However, where the catalyst comprises at least one Group VIII metal or compound thereof and also at least one Group VI metal or compound thereof, the catalyst has a high activity and a low fouling rate. The Group VI metals and compounds thereof that may be used include chromium, molybdenum and tungsten and compounds thereof. The Group VIII metals and compounds thereof that may be used include iron, cobalt, nickel, platinum and palladium and compounds thereof. The most preferred catalysts comprise nickel and either tungsten or molybdenum on a silica-magnesia support, the catalyst in each case preferably being sulfided. The single main preferred catalyst which has been found to have the most outstanding qualities in the process of the present invention comprises nickel and tungsten on silica-magnesia, preferably sulfided. The Group VI metal or compounds thereof may be present in the catalyst in an amount from 1 to 40 weight percent, preferably from 2 to 25 weight percent, based on the total catalyst composite; the Group VIII metal or compound thereof may be present in an amount of from 1 to 30 weight percent, preferably from 2 to 20 weight percent, based on the total catalyst composite. The magnesia content of the silica-magnesia support may range from 5 to 75 weight percent, preferably from 15 to 50 weight percent, and still more preferably from 20 to 35 weight percent.

C. *Preparation of catalyst with silica-magnesia support.*—The silica-magnesia support of the catalyst can be prepared by any conventional method, and the plurality of hydrogenating components may be incorporated in the catalyst by any conventional method. A particularly effective method for preparing the catalyst is set forth in the following example:

*Example 1*

A powdery silica-magnesia material containing about 28% magnesia was compressed, together with about 5% by weight of a conventional glue-type bonding material used in catalyst preparation, into 3/16" x 3/16" pellets, and was calcined in air at 950° F. for six hours.

1000 ccs. of the aforesaid calcined material were impregnated for four hours with 800 ccs. of a solution of nickel nitrate containing 11.2% nickel, and the impregnated material was dried for 24 hours at 250° F. and then calcined for four hours at 900° F. The resulting product was a catalyst support containing 9.43% nickel.

The aforesaid catalyst support was impregnated three times with separate 800 cc. portions of a solution consisting of 960 g. of tungstic acid ($H_2WO_4$) dissolved in a mixture of 1352 cc. of 30% ammonia ($NH_3$) and 3460 cc. of water. After each of the aforesaid impregnation treatments, the impregnated composite was dried at 250° F. for 20 hours, and calcined at 900° F. for four hours. The catalyst resulting from the foregoing operations contained 7.02 weight percent nickel and 19.3 weight percent tungsten, and had a nitrogen surface area of 316 m.²/g.

D. *Sulfiding the catalyst.*—Although the catalyst of the present invention may be used in the unsulfided form, the sulfided form is preferable. With feeds containing any substantial amounts of sulfur compounds, the catalyst automatically will tend to become sulfided on the surface under the operating conditions of the process. It is somewhat more preferable to presulfide the catalyst before placing it on-stream, and such sulfiding may be accomplished by any conventional method.

E. *Regeneration of the catalyst.*—It is an outstanding advantage of the catalyst of the present invention that it may be regenerated, particularly in view of the difficulties that have been met by the art in the regeneration of many prior art catalysts. While regeneration may be accomplished by any conventional method, and while the relative effectiveness of such methods may be readily determined by those skilled in the art, the regeneration method set forth in Table IV below is a highly effective one.

F. *Preferred catalysts.*—The preferred catalysts for use in the process of the present invention are set forth above.

G. *Activity of catalyst for denitrification.*—The catalyst of the present invention is a denitrification catalyst, as well as a hydrocracking catalyst, and in the process of the present invention performs both functions under the conditions of the process. The catalyst has excellent denitrification activity, but it is relatively insensitive to nitrogen, and is highly insensitive to nitrogen compared with a conventional acidic hydrocarcking catalyst such as nickel sulfide on silica-alumina.

Not only are a plurality of hydrogenation components, at least one of which must be a Group VI metal or compound thereof and at least one of which must be a Group VIII metal or compound thereof, essential to the hydrocracking activity of the catalyst of the present invention, but this same plurality of hydrogenation components is essential to the denitrification activity of the catalyst of the present invention. For example, the preferred nickel-tungsten on silica-magnesia catalyst of the present invention would not have good denitrification activity if only nickel or only tungsten were present; single hydrogenating components, for example molybdenum or tungsten from Group VI or nickel or cobalt from Group VIII, are relatively ineffective for denitrification when not accompanied by a hydrogenating component from the other one of the two groups. Further information regarding the denitrification activity of the catalyst is set forth in Table V below.

H. *Selectivity of catalyst for middle distillate production.*—The catalyst of the present invention has a high selectivity for the production of middle distillates from various hydrocarbon feeds. It has a much greater selectivity for the production of middle distillates than conventional acidic hydrocarcking catalysts, such as nickel sulfide on silica-alumina. The high yields of middle distillates resulting from the selectivity of the catalyst of the present invention for middle distillate product is unexpected in view of the selectivity for gasoline production that is characteristic of many prior art hydrocracking catalysts, for example nickel sulfide on silica-alumina. Further information regarding the selectivity of the present invention catalyst for the production of middle distillates is set forth in Table III below.

DESCRIPTION OF PROCESS FLOW ARRANGEMENTS SUITABLE FOR CARRYING OUT THE PROCESS OF THE PRESENT INVENTION

Referring now to the drawing, there shown is a diagrammatic illustration of an embodiment of process units and flow paths suitable for carrying out the process of the present invention. This illustration will be discussed below in connection with a 650° to 1070° F. vacuum gas oil feed, which is one example of the various feeds that may be processed in accordance with the process of the present invention.

The aforesaid 650° to 1070° F. vacuum gas oil feed is passed through line 1 into contact in hydrocracking zone 2 with the aforesaid alumina-supported or silica-magnesia supported catalyst and with hydrogen entering zone 2 through line 3 under the hydrocarcking conditions previously discussed. From zone 2, an effluent is passed through line 4 to separation zone 5, from which hydrogen is recycled through line 6, ammonia is withdrawn through line 7, and remaining materials are passed through line 8 to separation zone 9.

From separation zone 9, a C₃ and C₄ stream, including isobutane, is withdrawn through line 10, and remaining higher boiling materials are passed through line 15 to separation zone 16. From separation zone 16, a C₅ to 180° F. light gasoline fraction is withdrawn through line 17, a 180° to 300° F. heavy gasoline fraction is passed through line 18 to second hydrocracking zone 19, a 300° to 650° F. middle distillate product is withdrawn through line 20, and materials heavier than about 650° F. are passed through line 24 to second hydrocracking zone 19. If desired, a portion of the materials in line 24 boiling above about 650° F. may be withdrawn from the system through line 25. If desired, a portion of these materials may be recycled through line 26 to first hydrocracking zone 2; it has been found that the normal paraffin content of these materials is low enough to permit such recycle back to the first stage hydrocracking zone reactor 2.

Because the reaction kinetics for hydrocracking in zone 19 are different for the 180° to 300° F. materials entering zone 19 through line 18 and for the materials boiling above 650° F. entering zone 19 through line 24, it has been found in accordance with the present invention that the latter materials should be passed through only a portion preferably 30 to 50 volume percent, of the catalyst bed in zone 19. This most desirably may be accomplished by utilizing a downflow hydrocracking reactor 19, and passing the materials boiling above 650° F. through line 24 into reactor 19 from 50 to 70% of the linear distance down the catalyst bed. It has been found that sufficient quantities of products with the unique product structure desired, namely valuable light gases, light gasoline and middle distillates, may be obtained by operating in the foregoing manner, in which part or all of the 180° to 300° F. material produced in the first stage is hydrocracked again in the second stage to produce valuable light gases, and in which the nonsynthetic material from the first stage, i.e., the material boiling above the initial boiling point of the first stage feed, is converted in the second stage to lower boiling materials.

Second hydrocracking zone 19 is supplied with hydrogen through line 27 and, if desired, also may be supplied, from an extraneous source, with additional quantities of 180° to 300° F. materials through line 28. Hydrocracking zone 19 may contain a conventional acidic hydrocracking catalyst, for example nickel sulfide on silica-alumina, platinum on silica-alumina, etc., and may operate under conventional hydrocracking conditions, for example a pressure of from 500 to 3000 p.s.i.g. and a temperature of from 550° to 850° F. It is well known that such catalysts can be subjected to regeneration with an oxygen-containing gas under conventional regeneration conditions.

Through line 29 an effluent is withdrawn from hydrocracking zone 19, containing products produced by the hydrocracking reaction in zone 19. This effluent may be passed to any conventional separation facilities for recovery of the desired products therefrom. Most desirably, this effluent is passed, as shown in the drawing, through line 29 to separation zone 9, so that separation zones 9 and 16 may serve as common facilities for separation of the products produced in both hydrocracking zone 2 and hydrocracking zone 19.

Hydrocracking zone 2 may comprise two hydrocracking reactors, each containing the catalyst of the present invention and each operating under the aforesaid process conditions. These two reactors may be arranged in a known manner so that alternately they can be connected in parallel and in series. When connected in parallel, they will operate to maximize middle distillate production, and when switched to series operation they may maximize gasoline or middle distillate production. In series operation, middle distillate production may be maximized by withdrawing middle distillate as a product from the first reactor as well as from the second, for example from an interreactor fractionation zone. In series operation, gasoline production may be maximized by including the middle distillate produced in the first reactor in the feed to the second reactor. In either series arrangement, it is preferred to remove from the system any ammonia produced in the first reactor, rather than permitting it to pass to the second reactor. Such switching arrangements will enable the ratio of middle distillate to gasoline product to be varied in order to achieve further process application flexibility. In series operation to produce gasoline, where ammonia formed in the first reactor has been removed, the second reactor, because it is operating with a feed that has been denitrified in the first reactor, is operable at lower temperatures, thus providing leeway for increase in severity of the operating conditions in the second reactor to increase gasoline production. The resulting gasoline, produced over the catalyst of the present invention, is isoparaffinic and of high quality, in contrast to the normal paraffinic character of gasoline produced over hydrocracking catalysts having weak acidity.

Because the catalyst in zone 2 serves as an effective hydrofining catalyst, the materials in line 8 are low in nitrogen and therefore are especially suitable for further hydrocracking in the presence of the acidic catalyst in zone 19.

The process of the present invention is especially effective for converting heavy feed such as residua and propane deasphalted oils when a conventional denitrification zone is inserted between the first hydrocracking zone and the second hydrocracking zone of the process. Because such feeds generally are especially difficult to denitrify, and because for most efficient results the feed to the second conversion zone 19 here, containing an acidic hydrocracking catalyst, should have a minimum nitrogen level, the insertion of a conventional denitrification zone between the two hydrocracking zones in the present process can be of significant value.

The conventional denitrification zone may be inserted, for example, in line 8 or line 15, and may be operated under conventional denitrification conditions with either the alumina-supported or the silica-magnesia supported catalyst used in hydrocracking zone 2, or with any conventional denitrification catalyst. Such a three-stage process enables the heavier feeds to be hydrocracked and partially denitrified in the first stage, thereby reducing both the molecular weight and the nitrogen level of the feed and greatly accelerating the rate of the remaining denitrification to be accomplished in the second, or conventional, denitrification zone.

TABLE I.—COMPARISON OF PREFERRED NICKEL-TUNGSTEN ON SILICA-MAGNESIA FIRST STAGE CATALYST OF PROCESS OF PRESENT INVENTION WITH CONVENTIONAL CATALYSTS RE STARTING TEMPERATURES AND FOULING RATES

The following table sets forth on a comparative basis single stage hydrocracking results of processing a 650° to 980° F. heavy Arabian gas oil having a total nitrogen content of 660 to 700 p.p.m. at the indicated average catalyst temperature, about 50 to 55 volume percent substantially constant per-pass conversion to products boiling below the initial boiling point of the feed, 1.0 LHSV, 2000 p.s.i.g. and a hydrogen rate sufficient to permit withdrawal from the hydrocracking zone of 4500 s.c.f. of hydrogen per barrel of feed, over the preferred nickel-tungsten on silica-magnesia first stage catalyst of the present invention compared with hydrocracking the same feed under the same conditions over various prior art catalysts. The factors compared are: (1) the average catalyst temperature necessary to give said substantially constant 50 to 55% per-pass conversion, which substantially constant conversion is indicated by the substantially constant product gravity shown; and (2) the catalyst fouling rate.

| Cat. No. | Support | | Hydrogenating Component (percent) | | | | Area, m.²/g. | Av. Cat. Temp., °F. Necessary for Desired Conversion | Product Gravity | Fouling Rate |
|---|---|---|---|---|---|---|---|---|---|---|
| | SiO₂-Al₂O₃ | SiO₂-MgO | Ni | W | Mo | Pt | | | | |
| 1 | | 27% MgO | 7.0 | 19.3 | | | 316 | 759 | 40.0 | None observable.[1] |
| 2 | | 27% MgO | 4.9 | | 22.8 | | 254 | 755 | 40.3 | Do.[1] |
| 3 | | 27% MgO | 5.0 | | 5.0 | | | 756 | 39.9 | Moderate.[2] |
| 4 | | 27% MgO | 5.0 | 1.8 | | | | 767 | 39.5 | Do.[2] |
| 5 | | 27% MgO | | 8.5 | | | 437 | 790 | 39.5 | High.[3] |
| 6 | | 27% MgO | 9.0 | | | | 445 | 765 | 40.3 | Very High.[4] |
| 7 | | 27% MgO | | | | 0.5 | | 845 | 38.5 | Do.[4] |
| 8 | 25% Al₂O₃ | | 4.5 | 12.2 | | | 134 | 790 | 40.3 | None Observable.[1] |
| 9 | 28% Al₂O₃ | | 3.9 | 10.4 | | | 130 | 792 | 40.0 | Moderate.[2] |
| 10 | 47% Al₂O₃ | | 5.0 | 7.0 | | | | 780 | 40.0 | Do.[2] |
| 11 | 47% Al₂O₃ | | 4.4 | | 9.4 | | 92 | 790 | 39.8 | Do.[2] |
| 12 | 10% Al₂O₃ | | | 18.0 | | | 116 | 805 | 39.8 | High.[3] |

[1] 0.05° F. per hour.
[2] 0.10-0.15° F. per hour.
[3] 0.5° F. per hour.
[4] 1.0° F. per hour.

From the above table, it will be noted that only catalysts 1 to 4 resulted in both (1) the desired conversion rate at a reasonably low average catalyst temperature, in each case 767° F. or below, and (2) a reasonably low catalyst fouling rate, in each case, moderate, as defined, or less. It will be noted that catalysts 5 to 7, each having one hydrogenating component only, on a silica-magnesia support, resulted in an excessive catalyst fouling rate, i.e., one that was high, as defined, or higher. It will be noted that catalysts 8 to 12, each having a silica-alumina support rather than the preferred silica-magnesia support of the first stage catalyst of the present invention, resulted in the desired conversion being obtained only at an unreasonably high average catalyst temperature, in each case 780° F. or above.

TABLE II.—COMPARISON OF PREFERRED NICKEL-TUNGSTEN ON SILICA-MAGNESIA FIRST STAGE CATALYST OF PRESENT INVENTION WITH CONVENTIONAL CATALYSTS RE ACIDITY, STARTING TEMPERATURE, ISO TO NORMAL C₄ PRODUCT RATIO, MIDDLE DISTILLATE TO GASOLINE PRODUCT RATIO, AND NORMAL PARAFFIN CONTENT OF UNCONVERTED BOTTOMS

The following table sets forth on a comparative basis single-stage hydrocracking results of processing an Arabian straight run feed, at 0.5 LHSV, 2000 p.s.i.a., 60% perpass conversion to products boiling below the initial boiling point of the feed, and extinction recycle, over the preferred nickel-tungsten on silica-magnesia first stage catalyst of the present invention, compared with hydrocracking the same feed under the same conditions over various prior art catalysts. The factors compared are: (1) starting temperature necessary to give said 60% perpass conversion; (2) the ratio of $iC_4$ to $nC_4$ in the product; (3) the ratio of 400° to 650° F. product to $C_5$ to 400° F. product; i.e., the ratio of middle distillate production to gasoline production; (4) the hydrogen consumption, in s.c.f. per barrel of feed; and (5) the change, in ° F., of the pour point of the same bottoms fraction in each case, from the pour point of the feed, as an indication of the effect of the reaction in each case on normal paraffins in the system.

The catalysts in the above table are set forth in order of increasing acidities, with catalyst A having the lowest acidity and catalyst E having the highest acidity. Catalyst C is an example of the first stage catalyst of the present invention, while the other catalysts indicated are representative of various prior art catalysts.

From the above table it will be noted that: (1) as acidity increases, the product iso to normal ratio increases smoothly, except in the case of the preferred first stage catalyst of the present invention, with which is obtained a higher ratio than would be expected from the inspection of the prior art catalysts alone; (2) as acidity increases, the product middle distillate to gasoline ratio decreases, but remains as high with the first stage catalyst of the present invention as with catalysts of weaker acidity, which is entirely unexpected; heretofore, it has been believed that a catalyst of higher acidity would produce less middle distillate per unit of gasoline production than a more weakly acidic catalyst; (3) as acidity increases, hydrogen consumption increases smoothly, except in the case of the first stage catalyst of the present invention, with which is obtained a higher hydrogen consumption and improved product quality; (4) as acidity increases, the normal paraffin content of the unconverted bottoms material, as indicated by the ° F. change in bottoms pour point from the pour point of the feed, decreases and then increases; with catalysts A and E the bottoms material is indicated to have a greater normal paraffin content than the feed. With catalysts B, C and D the unconverted bottoms material is less paraffinic than the feed, which is extremely desirable because normal paraffins are refractory to hydrocracking and therefore build up in recycle bottoms during recycle operation. A build-up of refractory normal paraffins can effectively prevent the practical use of recycle hydrocracking to produce middle distillates, because prohibitive temperature and pressure increases can be required to crack these refractory compounds; (5) with catalysts B, C and D the undesirable refractory normal paraffins are selectively cracked and/or are isomerized to valuable isoparaffins, to an extent adequate to permit satisfactory recycle operation.

| Cat. | Cat. Comp. | Start. T., °F. | iC₄/nC₄ | 400-650° F. / C₅-400° F. | H₂, s.c.f./bbl. | Bottoms Pour Point Change, °F. |
|---|---|---|---|---|---|---|
| A | 6% Ni+22% Mo on Al₂O₃ | 850 | 0.2 | 1.4 | 1,300 | +13 |
| B | NiMo on SiO₂-Al₂O₃, 30% SiO₂ | 765 | 0.6 | 1.4 | 1,700 | −38 |
| C | NiW on SiO₂-MgO, 27% MgO | 720 | 1.1 | 1.4 | 2,000 | −25 |
| D | NiMo on SiO₂-Al₂O₃, 90% SiO₂ | 790 | 0.6 | 0.9 | 1,800 | −15 |
| E | 6% Ni on SiO₂-Al₂O₃, 90% SiO₂ | 740 | 1.1 | 0.4 | 2,600 | +19 |

TABLE III.—COMPARISON OF PREFERRED NICKEL-TUNGSTEN ON SILICA-MAGNESIA FIRST STAGE CATALYST OF PRESENT INVENTION WITH CATALYST HAVING SILICA-ALUMINA SUPPORT RE PRODUCTION OF MIDDLE DISTILLATES

The following table further indicates the specificity of the preferred nickel-tungsten on silica-magnesia first stage catalyst of the present invention for the production of middle distillates from various hydrocarbon feeds, compared with a catalyst having a silica-alumina support. In this case, the feed is a 650° to 820° F. hydrofined Midway gas oil, containing 3.6 p.p.m. total nitrogen. It is hydrocracked at 0.77 LHSV, 1500 p.s.i.g. and a hydrogen rate of 5000 s.c.f. per barrel of feed, over each of the two catalysts, with the results indicated:

| Catalyst | Temp., °F. | Total Conversion to Products Boiling Below 650° F. | Percent of Product in 400–650° F. Boiling Range |
|---|---|---|---|
| NiW on SiO$_2$-Al$_2$O$_3$ | 650 | 53.2 | 41 |
| NiW on SiO$_2$-MgO | 650 | 53.4 | 49 |

TABLE IV.—REGENERABILITY OF PREFERRED NICKEL-TUNGSTEN ON SILICA-MAGNESIA FIRST STAGE CATALYST OF PRESENT INVENTION AND REGENERATED CATALYST ACTIVITY

The following table illustrates the regenerability of the preferred nickel-tungsten on silica-magnesia catalyst of the present invention. A catalyst comprising 7.0% nickel and 19.3% tungsten on a silica-magnesia support containing 27.7% magnesia, with an area of 316 m.$^2$/g., was placed in hydrocracking reactor and contacted for 120 hours at 2000 p.s.i.g., 1.0 LHSV, 759° F. average catalyst temperature, and hydrogen rate of 5500 s.c.f. per barrel of feed, with a hydrocarbon feed boiling from 650° to 982° F., said feed having a gravity of 23.5° API, an aniline point of 178.9° F., a pour point of +90 ASTM and a total nitrogen content of 665 p.p.m. The catalyst under these conditions converted 54 weight percent of the feed to products boiling below the 650° F. initial boiling point of the feed, and the gravity of the total products produced was 40.3° API.

After the foregoing on-stream period the catalyst was regenerated in a nitrogen-oxygen stream, at a reactor pressure of 600 p.s.i.g. and a gas rate of 20 cubic feet per hour, for a total period of 20 hours. During this period the temperature was slowly raised from 500° to 900° F., and the oxygen content of the gas was raised from 0.1 to 4.0 volume percent.

The regenerated catalyst having an area of 237 m.$^2$/g., was then used to hydrocrack the same feed that it had been used to hydrocrack prior to regeneration, under the same conditions. The activity of the regenerated catalyst was substantially equal to its original fresh activity, as indicated by its conversion, at an average catalyst temperature of 750° F., of 48 weight percent of the feed to products boiling below the initial boiling point of the feed, the total products produced having a gravity of 38.8° API.

The following summarizes the foregoing results:

| | Area, m.$^2$/g. | Average Cat. Temp., °F. | Whole Product Gravity | Weight Percent Conversion to Products Boiling Below 650° F. |
|---|---|---|---|---|
| Fresh Catalyst | 316 | 759 | 40.3 | 54 |
| Regenerated Catalyst | 237 | 750 | 38.8 | 48 |

TABLE V.—COMPARISON OF PREFERRED NICKEL-TUNGSTEN ON SILICA-MAGNESIA FIRST STAGE CATALYST OF PRESENT INVENTION WITH CONVENTIONAL CATALYSTS RE DENITRIFICATION ABILITY, NITROGEN SENSITIVITY AND ABILITY TO CONVERT NITROGEN-CONTAINING FEEDS TO MIDDLE DISTILLATES

The following table indicates results obtainable with the first stage catalyst of the present invention and with a low acidity prior art catalyst, and a high acidity prior art catalyst, respectively, when used to hydrocrack a 650° to 1000° F. hydrocarbon feed at the indicated temperatures, and at 1.0 LHSV, 2000 p.s.i.g. and a hydrogen rate of 6500 s.c.f. per barrel, with extinction recycle of unconverted products. The indicated low nitrogen feeds refer to feeds containing from zero to 10 p.p.m. nitrogen and the indicated high nitrogen feeds refer to feeds containing above 10 p.p.m. nitrogen, for example 10 to 1000 p.p.m. nitrogen.

| | NiW on SiO$_2$-MgO, 27% MgO | 6% Ni + 22% Mo on Al$_2$O$_3$ | 6% Ni on SiO$_2$-Al$_2$O$_3$, 90% SiO$_2$ |
|---|---|---|---|
| Temperature, in °F. for 50% conversion with low N feeds | 650 | 850 | 550 |
| Temperature in °F. for 50% conversion with high N feeds | 740 | 850 | 760 |
| Maximum yield of 320–650° F. middle distillate, with high N feeds, percent | 75–85 | 75–85 | 55–65 |
| iC$_4$/nC$_4$ product ratio | high | low | high |
| Pour Point of synthetic middle distillate product, °F. | −40 | −20 | −60 |
| Relative denitrification activity | 1.3 | 1.0 | 0.1 |
| Sensitivity to S | nil | nil | nil |
| Sensitivity to N | low | nil | high |

From the foregoing it will be seen that the process of the present invention is effective to convert a wide range of hydrocarbon feeds to valuable products, mainly middle distillates, light gasoline, and gaseous products including isobutane.

Although only specific embodiments of the present invention have been described, numerous variations could be made in those embodiments without departing from the spirit of the invention, and all such variations that fall within the scope of the appended claims are intended to be embraced thereby.

We claim:

1. A process for producing gasoline, middle distillates and isobutane from a hydrocarbon feed selected from the group consisting of petroleum distillate boiling from about 750° F. to 1100° F. and petroleum residua boiling above 650° F., which comprises contacting said feed and from 1000 to 10,000 s.c.f. of hydrogen per barrel of said feed in a first conversion zone at a temperature from 500° F. to 950° F., a pressure above 500 p.s.i.g. and an LHSV of 0.1 to 4.0 with a weakly acidic hydrocracking catalyst, recovering from the effluent from said first conversion zone a gaseous stream comprising isobutane, a middle distillate product, a light gasoline product, a heavy gasoline fraction and a fraction boiling above about 650° F., hydrocracking at least a substantial portion of said heavy gasoline fraction by passage thereof through a body of active acidic hydrocracking catalyst in a second conversion zone under hydrocracking conditions to produce valuable light gases and light gasoline, hydrocracking at least a substantial portion of said fraction boiling above about 650° F. by passage thereof through only a 30 to 50 volume percent portion of said body of active acidic hydrocracking catalyst in said second conversion zone under said hydrocracking conditions to produce middle distillates, and recovering from the effluent from said second conversion zone a gaseous stream comprising isobutane, a middle distillate product, a light gasoline product and a heavy gasoline fraction.

2. A process as in claim 1 wherein the effluent from said second conversion zone is combined with the effluent from said first conversion zone, and the separation of said effluents into various fractions is accomplished in common separation facilities.

3. A process as in claim 1, wherein at least a portion of said fraction boiling above about 650° F. recovered from the effluent from said first conversion zone is recycled to that zone.

4. A process as in claim 1 wherein said weakly acidic hydrocracking catalyst comprises at least one hydrogenating component selected from the group consisting of Group VI metals and compounds thereof and at least one hydrogenating component selected from the group consisting of Group VIII metals and compounds thereof on a silica-magnesia catalyst support.

5. A process as in claim 1 wherein said catalyst in said first conversion zone comprises nickel and tungsten on a silica-magnesia support.

6. A process as in claim 1 wherein said catalyst in said first conversion zone comprises nickel and molybdenum on an alumina support.

References Cited by the Examiner
UNITED STATES PATENTS

| | | | |
|---|---|---|---|
| 2,885,346 | 5/59 | Kearby | 208—110 |
| 2,971,900 | 2/61 | Weekman | 208—112 |
| 3,000,809 | 9/61 | Ridgway | 208—65 |
| 3,026,260 | 3/62 | Watkins | 208—110 |
| 3,037,930 | 6/62 | Mason | 208—59 |
| 3,132,087 | 5/64 | Kelley et al. | 208—54 |
| 3,312,090 | 5/64 | Helfrey et al. | 208—89 |

ALPHONSO D. SULLIVAN, *Primary Examiner.*